(12) United States Patent
Crutsinger et al.

(10) Patent No.: US 10,203,061 B2
(45) Date of Patent: Feb. 12, 2019

(54) FLUID REGULATOR WITH FIELD CONVERTIBLE SLAM-SHUT DEVICE

(71) Applicant: EMERSON PROCESS MANAGEMENT REGULATOR TECHNOLOGIES, INC., McKinney, TX (US)

(72) Inventors: G. Glynn Crutsinger, McKinney, TX (US); Chun Lin, McKinney, TX (US); Horatiu P. Tripon, Cluj-Napoca (RO)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 0 days.

(21) Appl. No.: 15/431,003

(22) Filed: Feb. 13, 2017

(65) Prior Publication Data
US 2017/0152983 A1 Jun. 1, 2017

Related U.S. Application Data

(62) Division of application No. 14/275,245, filed on May 12, 2014, now Pat. No. 9,593,782.
(Continued)

(51) Int. Cl.
*F16K 31/00* (2006.01)
*F16L 55/07* (2006.01)
(Continued)

(52) U.S. Cl.
CPC ............... *F16L 55/07* (2013.01); *F16K 7/14* (2013.01); *F16K 17/164* (2013.01); *F16K 27/00* (2013.01);
(Continued)

(58) Field of Classification Search
CPC ................... F16K 7/14; F16K 31/003
(Continued)

(56) References Cited

U.S. PATENT DOCUMENTS 2,881,787 A * 4/1959 Sullivan ............... F16K 31/42
137/271
3,542,056 A 11/1970 Chinn
(Continued)

FOREIGN PATENT DOCUMENTS

DE 8107647 U1 7/1982
DE 102010001086 A1 7/2011

OTHER PUBLICATIONS

M Series—Pressure Regulators Flyer, 2 pages.
(Continued)

*Primary Examiner* — Marina Tietjen
*Assistant Examiner* — Paul J Gray
(74) *Attorney, Agent, or Firm* — Marshall, Gerstein & Borun LLP

(57) ABSTRACT

Installing a fluid regulator in a fluid distribution system by: determining the position and orientation of the fluid regulator in the fluid distribution system; determining if a first opening and/or a second opening in the body of the regulator, are accessible with the fluid regulator in the determined position and orientation; installing the slam-shut device in the first opening, if accessible, and securing a plate over the second opening; and installing the fluid regulator in the fluid distribution system. The first and second openings are dimensioned such that the slam-shut device can be secured at least partially within the first opening in a first configuration and can be secured at least partially within the second opening in a second configuration.

4 Claims, 3 Drawing Sheets

Related U.S. Application Data

(60) Provisional application No. 61/986,549, filed on Apr. 30, 2014.

(51) Int. Cl.
  *F16K 7/14* (2006.01)
  *F16K 31/126* (2006.01)
  *F16K 31/56* (2006.01)
  *F16K 17/164* (2006.01)
  *G05D 16/06* (2006.01)
  *F16K 27/00* (2006.01)
  *F16K 51/00* (2006.01)

(52) U.S. Cl.
  CPC ........ *F16K 31/003* (2013.01); *F16K 31/1266* (2013.01); *F16K 31/56* (2013.01); *F16K 51/00* (2013.01); *G05D 16/0655* (2013.01); *Y10T 29/49828* (2015.01)

(58) Field of Classification Search
  USPC ........................................ 137/456, 458, 463
  See application file for complete search history.

(56) References Cited

U.S. PATENT DOCUMENTS 4,067,355 A    1/1978  St. Clair
6,328,538 B1  12/2001  Rademacher

OTHER PUBLICATIONS

M Series—Pressure Regulators Bulletin, 20 pages.
M Series—Pressure Regulators Manual, 16 pages.
International Search Report and Written Opinion of PCT Patent Application No. PCT/US2015/028404, dated Sep. 18, 2015.
International Preliminary Report on Patentability for PCT/US2015/028404 dated dated Nov. 1, 2016.
First Office Action for CN Application No. 201510217187.5 dated May 25, 2018.

\* cited by examiner

FLUID REGULATOR WITH FIELD CONVERTIBLE SLAM-SHUT DEVICE

CROSS-REFERENCE TO RELATED APPLICATIONS

This application is a divisional of U.S. patent application Ser. No. 14/275,245, entitled "Fluid Regulator with Field Convertible Slam-Shut Device" and filed on May 12, 2014, which claims priority to U.S. Provisional Patent Application No. 61/986,549, entitled "Fluid Regulator with Field Convertible Slam-Shut Device" and filed on Apr. 30, 2014, the entire disclosures of which are hereby incorporated by reference herein.

FIELD OF THE DISCLOSURE

This disclosure relates generally to fluid regulators and, more specifically, to fluid regulators with having a slam-shut device.

BACKGROUND

The pressure at which typical fluid distribution systems supply fluid may vary according to the demands placed on the system, the climate, the source of supply, and/or other factors. However, most end-user facilities equipped with gas appliances such as furnaces, ovens, etc., require the gas to be delivered in accordance with a predetermined pressure, and at or below a maximum capacity of a gas regulator. Therefore, fluid regulators are implemented in these distribution systems in order to ensure that the delivered gas meets the requirements of the end-user facilities.

Fluid regulators, such as the Tartarini™ M Series Pressure Regulator, are primarily designed for industrial and commercial applications supplying fluids, such as natural gas and propane, to furnaces, burners, and other appliances and are generally well known in the art. Fluid regulators are typically used to regulate the pressure of a fluid to a substantially constant value. Specifically, a fluid regulator has an inlet that typically receives a supply fluid at a relatively high pressure and provides a relatively lower and substantially constant pressure at an outlet. To regulate the downstream pressure, fluid regulators commonly include a sensing element or diaphragm to sense an outlet pressure in fluid communication with a downstream pressure.

Fluid regulators can also include a slam-shut device, such as the Emerson® OS/66 series, that has its own shutter and seat and operates independent of the fluid regulator. Slam-shut devices can operate based on a maximum downstream pressure, a minimum downstream pressure, or maximum and minimum downstream pressure. When the downstream pressure is at a normal operating value, the slam-shut device remains open. When downstream pressure varies beyond its set limits, the slam-shut device closes and prevents fluid from flowing through the fluid regulator. One problem encountered with typically slam-shut devices is the position of an integrated slam-shut device in the fluid regulator. A typical integrated slam-shut device is accessible from one side of the body of the fluid regulator, between the input and the output. Depending on the field installation and/or skid design, the side of the fluid regulator where the slam-shut device is positioned can be inaccessible by the user. During normal line startup, maintenance, and/or trouble shooting, it is essential that a user be able to access the slam-shut device in a reasonable manner.

BRIEF SUMMARY OF THE DISCLOSURE

In accordance with one exemplary aspect of the present invention, a method of installing a fluid regulator in a fluid distribution system comprises the steps of: determining the position and orientation of the fluid regulator in the fluid distribution system; determining if a first opening in a first side of a body of the regulator between an inlet and an outlet and/or a second opening in a second side of the body of the regulator between the inlet and the outlet, opposite the first side, are accessible with the fluid regulator in the determined position and orientation, wherein the first and second openings are dimensioned such that a slam-shut device can be secured at least partially within the first opening in a first configuration and can be secured at least partially within the second opening in a second configuration; installing the slam-shut device in the first opening and securing a plate over the second opening if the first opening in the body is accessible; and installing the fluid regulator in the fluid distribution system.

In further accordance with any one or more of the foregoing exemplary aspects of the present invention, a method of installing a fluid regulator in a fluid distribution system may further include, in any combination, any one or more of the following preferred forms.

In one preferred form, the method further comprises the step of installing the slam-shut device in the second opening and securing the plate over the first opening if the first opening is not accessible and the second opening is accessible.

In another preferred form, the method further comprises the step of coupling a controller of the slam-shut device to the body such that the controller and the outlet of the body are in fluid communication.

In accordance with another exemplary aspect of the present invention, a method of retrofitting a fluid regulator comprises the steps of: removing a slam-shut device from a first opening in a first side of a body of the regulator between an inlet and an outlet; removing a plate from over a second opening in a second side of the body of the regulator, opposite the first side of the body, between the inlet and the outlet; installing the slam-shut device in the second opening; and securing the plate over the first opening; wherein the first and second openings are dimensioned such that a slam-shut device can be secured at least partially within the first opening in a first configuration and can be secured at least partially within the second opening in a second configuration.

In further accordance with any one or more of the foregoing exemplary aspects of the present invention, a method of retrofitting a fluid regulator may further include, in any combination, any one or more of the following preferred forms.

In one preferred form, the method further comprises the step of coupling a controller of the slam-shut device to the body such that the controller and the outlet of the body are in fluid communication.

DETAILED DESCRIPTION

The fluid regulator described herein can allow a user to retrofit a slam-shut device to either side of the body of the fluid regulator depending on field installation and/or skid design to have the best possible access to the slam-shut device.

Figure 1:
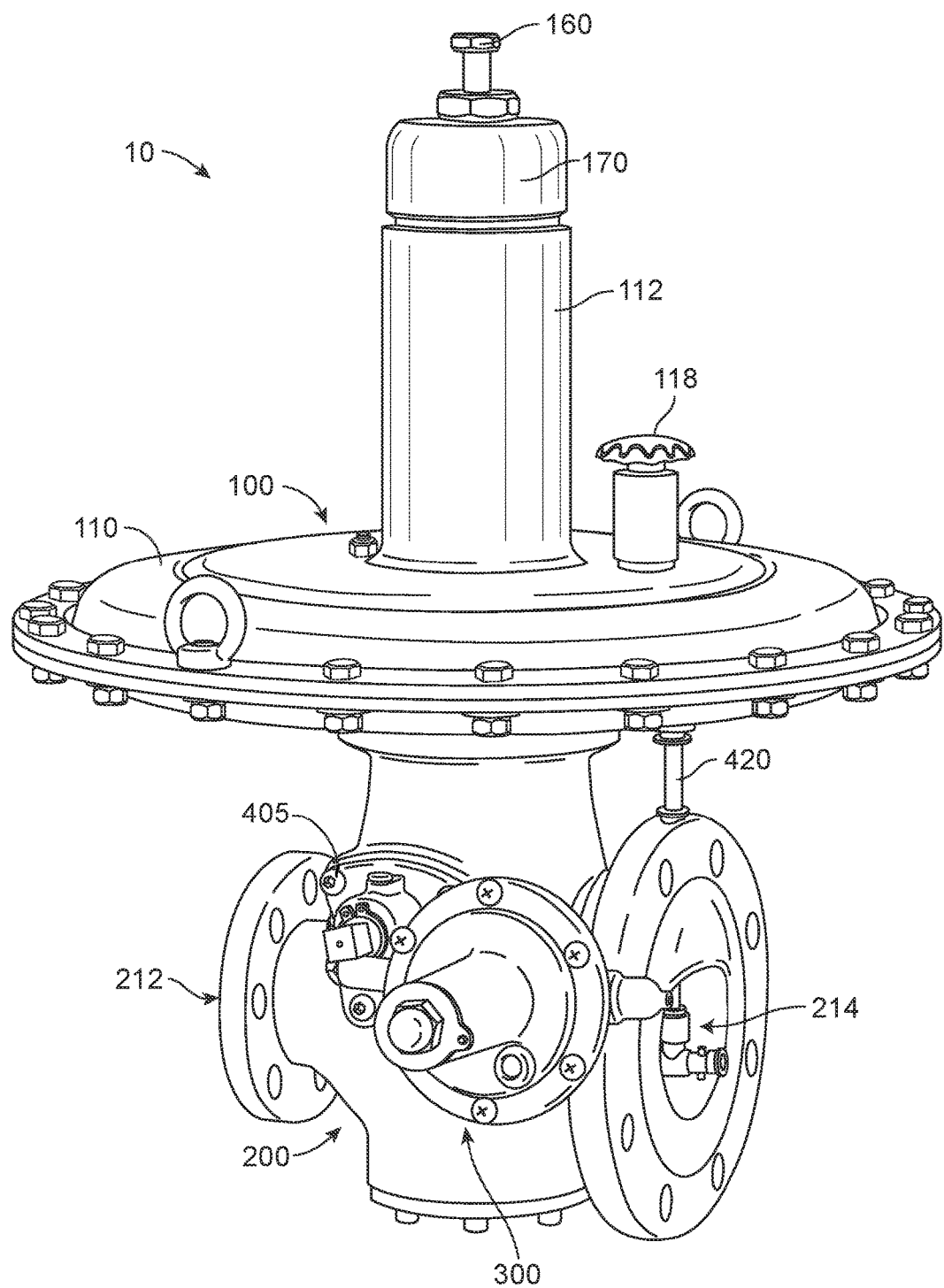
FIG. 1 is a front perspective view of an example fluid regulator with an integral slam-shut device.
Figure 2:
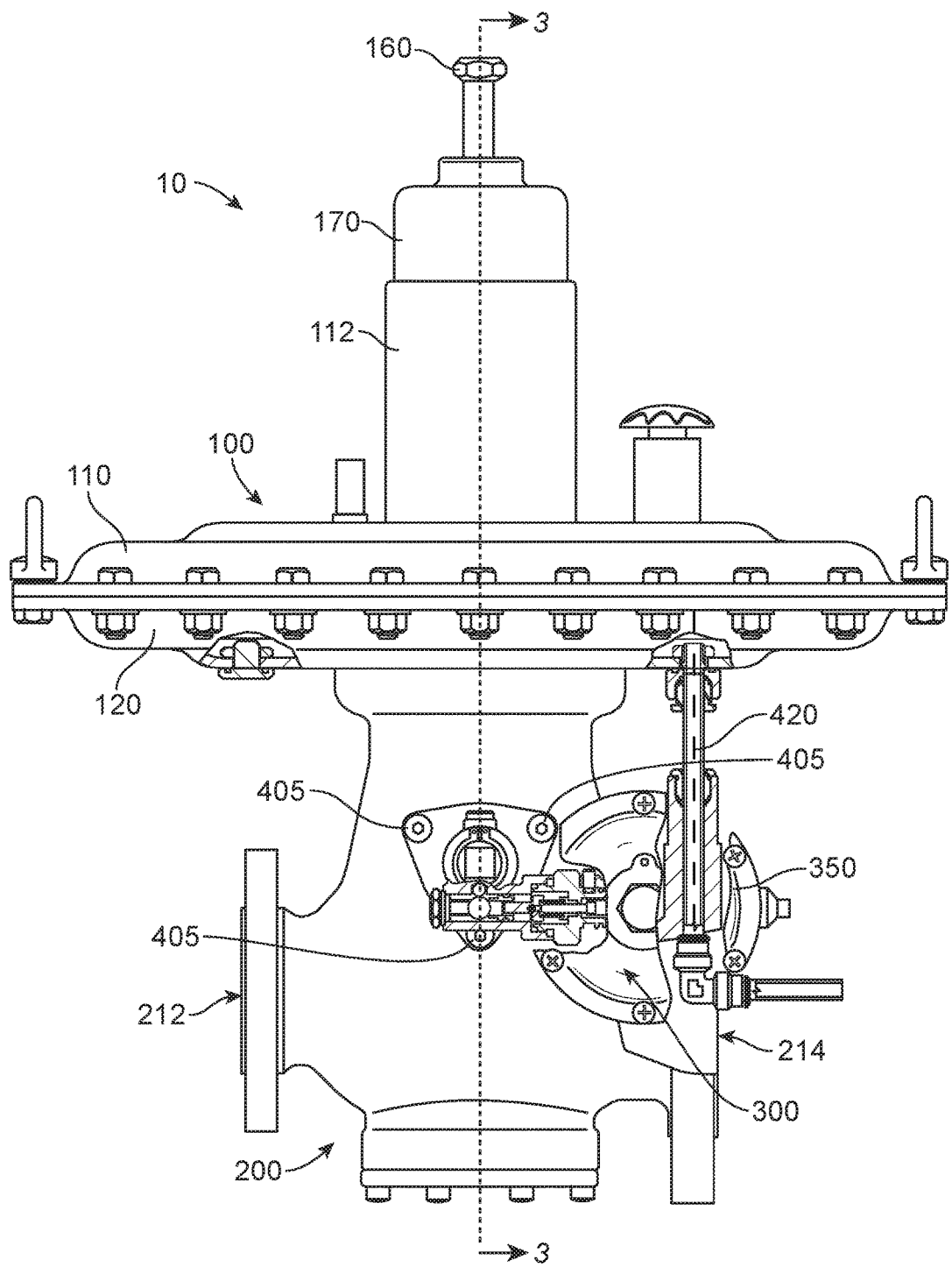
FIG. 2 is a front, partial cross-sectional view of the example fluid regulator of FIG. 1.
Figure 3:
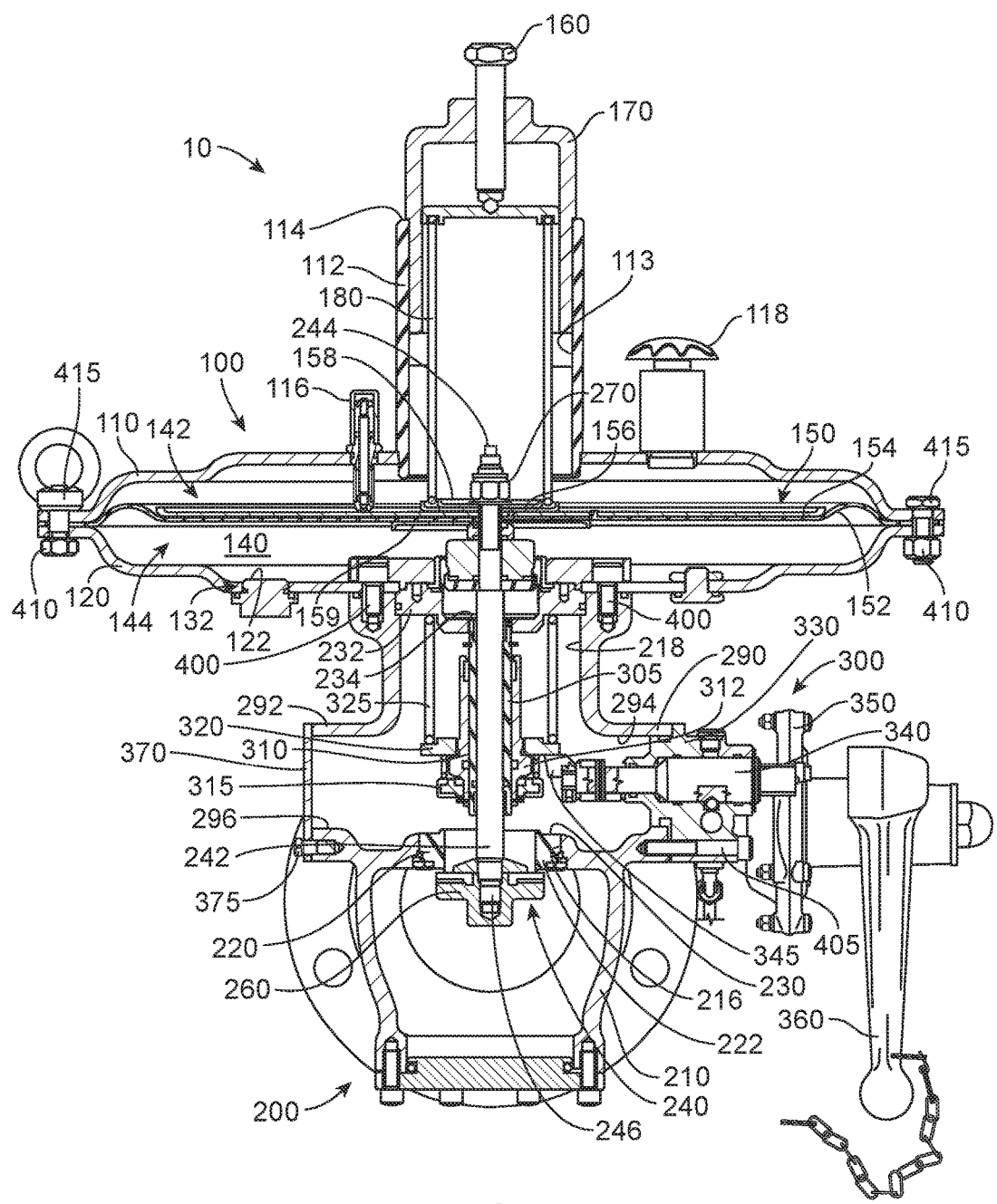
FIG. 3 is a cross-sectional view of the example fluid regulator of FIG. 2 taken along line 3-3.

Referring to FIGS. 1-3, an example fluid regulator 10 generally includes an actuator assembly 100, a body assembly 200 that can be secured to actuator assembly 100 with threaded members 400, and a slam-shut device 300 that can be secured to the body assembly 200 with threaded members 405, as described in more detail below.

As can best be seen in FIG. 3, actuator assembly 100 has an upper casing 110 secured to a lower casing 120 with nuts 410 and bolts 415, or any other well-known means, which when assembled define a cavity 140. A diaphragm assembly 150, as described in more detail below, is secured between upper casing 110 and lower casing 120 to divide cavity 140 into an upper portion 142 above diaphragm assembly 150 and a lower portion 144 below diaphragm assembly 150.

Upper casing 110 has a cylindrical wall 112 extending therefrom that has a threaded inner surface 113 and defines and opening 114 in one end. A closing cap 170 is threaded into the opening 114 of cylindrical wall 112 to prevent debris from entering actuator assembly 100 and an adjusting screw 160 is threaded into closing cap 170. A spring 180 is disposed in upper portion 142 of cavity 140 between adjusting screw 160 and diaphragm assembly 150 to bias diaphragm assembly 150 toward body assembly 200. A travel indicator 116 and/or a vibration damper 118 could also be secured to upper casing 110 and extend through apertures in upper casing 110.

Lower casing 120 has a threaded opening 132 that can be used to connect lower casing 120 to an external control line (not shown), which can be used to fluidly couple lower portion 144 of cavity 140 and outlet 214 of body 210 or a downstream pipe, as discussed in more detail below. When not in use, threaded opening 132 can be sealed with a plug 122 or any other well-known means.

Diaphragm assembly 150 generally includes a diaphragm 152, diaphragm plate 154, spring seat 156, and top and bottom sealing washers 158, 159. Diaphragm 152 is secured at its outer edge between upper casing 110 and lower casing 120 and has an opening formed in the center to receive stem 242 of stem assembly 240. Diaphragm plate 154 is positioned adjacent diaphragm 152 to provide support to the inner portion of diaphragm 152 and spring seat 156 is positioned adjacent diaphragm plate 154 to receive one end of spring 180. Top and bottom sealing washers 158, 159 are positioned on opposite sides of diaphragm 152 to secure diaphragm 152 and diaphragm plate 154 to stem 242, as described in more detail below, and to provide a seal to prevent fluid flow between upper portion 142 and lower portion 144 of cavity 140 through the opening in diaphragm 152.

Body assembly 200 generally includes a body 210, seat insert 220, and stem assembly 240. Body 210 is secured to actuator assembly 100 and defines a fluid inlet 212, a fluid outlet 214, and a fluid passage 216 fluidly connecting inlet 212 and outlet 214. An opening 218 is formed in body 210 and is in fluid communication with inlet 212 and aligned with fluid passage 216. Seat insert 220 is positioned and secured in fluid passage 216 and provides a first sealing surface 222 that engages valve disk 260 of stem assembly 240 when regulator 10 is in a closed position and a second sealing surface 230, opposite the first sealing surface 222, that engages a pad 315 of slam-shut device 300 when slam-shut device 300 is in a closed position. A plate 232 is positioned in opening 218 and an aperture 234 is formed through plate 232 to receive stem 242 of stem assembly 240. A pair of walls 290, 292 protrude from opposite sides of body 210 between inlet 212 and outlet 214 and each wall 290, 292 defines a device opening 294, 296, which can be axially aligned. Each opening 294, 296 is dimensioned to have a size and shape that allows openings 294, 296 to receive a portion of slam-shut device 300, as described in more detail below.

Stem assembly 240 generally includes a stem 242 and valve disk 260. Stem 242 is a generally cylindrical rod that extends through aperture 234 in plate 232 and has a first threaded end 244 that extends through openings in bottom sealing washer 159, diaphragm 152, diaphragm plate 154, spring seat 156, and top sealing washer 158 and a nut 270 is threaded onto first threaded end 244 to secure diaphragm assembly 150 to stem assembly 240. Valve disk 260 is threaded to or otherwise secured to a second threaded end 246 of stem 242.

Slam-shut device 300 includes a generally cylindrical cup 305 that is disposed in body 210 and slidably positioned around stem 242 and has a portion that can be received within aperture 234 in plate 232. Shutter 310 is positioned around and connected to cup 305 and has a pad 315 that can seal against second sealing surface 230 of seat insert 220 when slam-shut device 300 is in a closed position. Spring seat 320 is disposed within body 210 and positioned around shutter 310 and adjacent protrusion 312 in shutter 310. Spring 325 is positioned within body 210 between plate 232 and spring seat 320 to bias shutter 310 and pad 315 toward seat insert 220 and slam-shut device 300 toward a closed position.

Hub 330 of slam-shut device 300 is positioned within opening 294 and is secured to body 210 by threaded members 405. Shaft 340 extends through hub 330 and into body 210 and has a first end that includes cam 345 that can contact spring seat 320 to position slam-shut device 300 in an open position or a closed position. In the open position, cam 345 contacts spring seat 320 and prevents shutter 310 from moving into a closed position when slam-shut-device is inactivated. In the closed position, cam 345 moves out of the way of spring seat 320 and allows shutter 310 to move into a closed position when slam-shut device is activated. A second end of shaft 340, opposite cam 345, extends outside of body 210 and can have a polygonal shape to engage a handle 360, which can be removably connected to the second end of shaft 340 and used to rotate shaft 340 and move slam-shut device 300 between open and closed positions. A controller 350 is operatively connected to shaft 340 and is in fluid communication with outlet 214 of body 210 to monitor the outlet pressure of regulator 10. If the outlet pressure of regulator 10 is within preset limits, controller 350 prevents shaft 340 from rotating, which keeps slam-shut device in an open position. If the outlet pressure of regulator 10 exceeds the preset limits, controller 350 releases shaft 340 to move slam-shut controller into the closed position, thereby prevent the flow of fluid through regulator 10.

When slam-shut device 300 is installed and secured in opening 294 of wall 290, opposing opening 296 in wall 292 is covered with plate 370, which is secured to body 210 with threaded members 375. Plate 370 can also be sealed against body 210 by a gasket, O-ring, or any other means to prevent the flow of the operating fluid through opening 296. Alternatively, if the installation of regulator 10 requires slam-shut device 300 to be accessible on the opposite side of regulator 10 to provide access to slam-shut device 300, or for any other reason, slam-shut device 300 can be positioned in opening 296 of wall 292 and plate 370 can be used to cover opening 294 in wall 290. The positioning of slam-shut device 300 can be done in the field during installation and/or maintenance of regulator 10 or can be done during the manufacture of regulator 10.

In operation, when the valve disk 260 is in an open position the operating fluid enters body 210 through inlet 212 at an inlet pressure, through seat insert 220, and exits body 210 through outlet 214 at a downstream pressure. A portion of the operating fluid at the downstream pressure flows through an external control line 420 (FIGS. 1 and 2) and is communicated to lower portion 144 of cavity 140 through opening 132 in lower casing 120. Increased demand for the operating fluid at outlet 214 will cause the downstream pressure to decrease, which will decrease the pressure in lower portion 144 of cavity 140, and the upward pressure exerted on diaphragm 152, and allow spring 180 to move diaphragm 152 and stem assembly 240 downward, which will open valve disk 260 further and supply more operating fluid to the system to meet the increased demand. Decreased demand for the operating fluid at outlet 214 will cause the downstream pressure to increase, which will increase the pressure in lower portion 144 of cavity 140, and the upward pressure exerted on diaphragm 152, and move diaphragm 152 and stem assembly 240 upward, which will close valve disk 260 further to decrease the supply of the operating fluid to the system to meet the decreased demand.

In addition, a portion of the operating fluid at the downstream pressure will also flow through a second external control line (not shown) and is communicated to controller 350. Again, increased demand for the operating fluid at outlet 214 will cause the downstream pressure to decrease and decreased demand for the operating fluid at outlet 214 will cause the downstream pressure to increase. Controller 350 can be set to close slam-shut device if the outlet pressure increases above a preset value, decreases below a preset value, or both. If the outlet pressure surpasses a preset value, controller 350 will release shaft 340 and allow it to rotate, which will move cam 345 out of the way of spring seat 320. With cam 345 out of the way of spring seat 320, spring 325 will move shutter 310 and pad 315 downward until pad 315 seals against second sealing surface 230 of seat insert 220, thereby preventing the flow of the operating fluid through the regulator 10. Slam-shut device 300 can be reset by placing handle 360 on the end of shaft 340 and rotating shaft 340 until slam-shut device 300 is reset.

As discussed above, in the example shown the slam-shut device 300 is installed in opening 294 of wall 290. However, in some installations having slam-shut device 300 installed in this position may cause slam-shut device to be inaccessible to a user, making reset and maintenance difficult or impossible. In these types of installations, plate 370 can be removed from wall 292 and slam-shut device 300 can be installed in opening 296 of wall 292, opposite wall 290. Plate 370 can then be installed over opening 294 of wall 290.

When installing fluid regulator 10 in a fluid distribution system a user will first determine the position of regulator 10 in the system and the orientation of regulator 10 based on the direction of fluid flow. Once the position of regulator 10 in the system is determined, the user can determine if first opening 294 or second opening 296 is accessible with regulator 10 in that position and orientation. If it is determined that first opening 294 is accessible, slam-shut device 300 can be installed in first opening 294 and plate 370 can be secured over second opening 296. If it is determined that second opening 296 is accessible, slam-shut device 300 can be installed in second opening 296 and plate 370 can be secured over first opening 294. Once slam-shut device 300 has been installed, controller 350 of slam-shut device 300 can be coupled to body 210 so that outlet 214 of body 210 is in fluid communication with controller 350 and regulator 10 can be installed into the fluid distribution system. Alternatively, if regulator 10 has already been installed, regulator 10 can be retrofit to move slam-shut device between first opening 294 and second opening 296 to provide better access to slam-shut device 300.

While various embodiments have been described above, this disclosure is not intended to be limited thereto. Variations can be made to the disclosed embodiments that are still within the scope of the appended claims.

What is claimed is:

1. A method of installing a fluid regulator in a fluid distribution system, comprising the steps of:

determining the position and orientation of the fluid regulator in the fluid distribution system, the fluid regulator comprising an actuator assembly, a body secured to the actuator assembly and defining an inlet, an outlet, and a fluid passage disposed between the inlet and the outlet, a seat insert secured in the fluid passage, and a movable valve disk that engages a first sealing surface of the seat insert with the valve disk in a closed position;

determining if a first opening in a first side of a body of the regulator between an inlet and an outlet and/or a second opening in a second side of the body of the regulator between the inlet and the outlet, opposite the first side, are accessible with the fluid regulator in the determined position and orientation, wherein the first and second openings are dimensioned such that a slam-shut device can be secured at least partially within the first opening in a first configuration and can be secured at least partially within the second opening in a second configuration and the slam shut device comprises a pad that is movable between an open position and a closed position and engages a second sealing surface of the seat insert with the pad in a closed position;

installing the slam-shut device in the first opening and securing a plate over the second opening to seal the second opening with the plate when the first opening in the body is accessible and the second opening in the body is inaccessible;

installing the slam-shut device in the second opening and securing the plate over the first opening to seal the first opening with the plate when the second opening in the body is accessible and the first opening in the body is inaccessible; and installing the fluid regulator in the fluid distribution system.

2. The method of claim 1, further comprising the step of coupling a controller of the slam-shut device to the body such that the controller and the outlet of the body are in fluid communication.

3. A method of retrofitting a slam-shut device in a fluid regulator, the fluid regulator comprising an actuator assembly, a body secured to the actuator assembly and defining an inlet, an outlet, and a fluid passage disposed between the inlet and the outlet, a seat insert secured in the fluid passage, and a movable valve disk that engages a first sealing surface of the seat insert with the valve disk in a closed position, the method comprising the steps of: removing a slam-shut device from a first opening in a first side of a body of the regulator between an inlet and an outlet, the slam shut device comprising a pad that is movable between an open position and a closed position and engages a second sealing surface of the seat insert with the pad in a closed position;

removing a plate from over a second opening in a second side of the body of the regulator, opposite the first side of the body, between the inlet and the outlet; installing the slam-shut device in the second opening; and securing the plate over the first opening to seal the first opening with the plate; wherein the first and second openings are dimensioned such that the slam-shut device can be secured at least partially within the first opening in a first configuration and can be secured at least partially within the second opening in a second configuration.

4. The method of claim 3, further comprising the step of coupling a controller of the slam-shut device to the body such that the controller and the outlet of the body are in fluid communication.

\* \* \* \* \*